United States Patent Office 2,989,504
Patented June 20, 1961

2,989,504
VULCANIZATION OF POLYMER WITH N,N'-BIS-MALEIMIDES AND COMPOSITIONS THEREOF
Julian R. Little, Wayne, N.J., assignor to United States Rubber Company, New York, N.Y., a corporation of New Jersey
No Drawing. Filed May 18, 1960, Ser. No. 29,777
24 Claims. (Cl. 260—62)

This invention relates to a new method of vulcanizing highly unsaturated rubbers with bis-maleimides, and to the rubber vulcanized products so made.

This is a continuation-in-part of my copending application Serial No. 4,224, filed January 25, 1960, now abandoned, which in turn is a division of copending application Serial No. 811,517, filed May 7, 1959, now abandoned.

The method of the present invention broadly comprises heating an unvulcanized rubber in admixture with a N,N'-linked bis-maleimide or bis-citraconimide. Preferably, the vulcanization is accelerated with a thiazole-type accelerator, or, in some cases, with a free-radical generator such as an organic peroxide or an aliphatic azo compound. When the rubber is synthetic, the desirable physical characteristics of the vulcanizate are enhanced by employing a filler.

Most of the N,N'-linked bis-maleimides which are used in this invention can be made by the method disclosed by Searle in U.S. Patent No. 2,444,536, issued July 6, 1948, and by Arnold and Searle in U.S. Patent No. 2,462,835, issued March 1, 1949. They describe many of the bis-maleimides in the working examples. The following bis-maleimides, which we believe to be new, can also be made by their process.

| Product: | Melting point, ° C. |
|---|---|
| N,N'-ethylenebis-maleimide | 190–193 |
| N,N'-hexamethylenebis-maleimide | 137.0–9.5 |
| 2,6-bis-(maleimidomethyl) - 4 - t - butylphenol | 105–10 |
| N,N' - [4,4'(2,2' - dichlorodiphenylene)] dimaleimide | 300 |
| N,N'-[4,4' - sulfonyldiphenyl]dimaleimide | 255–58 |
| N,N'-durylenedimaleimide | 295 |
| N,N' - [4,4' - methylenediphenyl]dimaleimide | 160 |
| N,N'-(N,N' - hexamethylenedicarbamyl) dimaleimide | 174–80 |
| N,N'-(2,4-tolylene)dimaleimide | 170–71 |
| N,N'-(1,4-phenylene)dimaleimide | 300 |
| N,N'-(1,2-phenylene)dimaleimide | 255 |
| N,N'-oxydimethylenedimaleimide | 131–2 |
| N,N' - (1,4 - durylenediethylene)dimaleimide | 300 |

A few bis-maleimides can be made in still other ways. For example: N-methylolmaleimide is heated in boiling toluene in the presence of a small amount of an acidic catalyst such as p-toluenesulfonic acid until substantially the theoretical amount of water has evolved; N,N'-oxydimethylenedimaleimide, also known as bis-(maleimidomethyl)ether, crystallizes from the cooled solution. After recrystallization from ethanol it melts at 131–132° C.

The bis-citraconimides used in this invention are made by the same methods by which the corresponding bis-maleimides are made. Many of the citraconimides are described by Beilstein (4th ed.), vol. 21. Some typical bis-citraconimides are bis-citraconimide itself, N,N'-hexamethylene-bis-citraconimide, and 2,6-bis-(citraconimidomethyl)-4-tert-butylphenol.

The N,N'-linked bis-maleimides and bis-citraconimides operative in my invention are bis compounds which are joined directly at the nitrogen atoms without any intervening structure, or bis compounds wherein the nitrogen atoms are joined to and separated by an intervening divalent radical, such as alkylene, cycloalkylene, oxydimethylene, phenylene (three isomers), 2,6-dimethylene-4-alkylphenol, or sulfonyl.

The bis-maleimides and bis-citraconimides can be used according to the invention in widely varying amounts. However, I prefer to use from about 0.25 to about 6.0 parts of the curing agent (maleimide) per 100 parts of the rubber. It will be understood that the term "curing agent" (maleimide) includes both a single compound (maleimide) and a mixture of two or more compounds (maleimides) as defined above, and the term "rubber" includes both a single rubber and a mixture of two or more rubbers to be defined below.

The rubbers which are operable in this invention comprise the natural and the synthetic rubbers which have high olefinic unsaturation and which are conventionally vulcanized with sulfur. Such synthetic rubbers are the homopolymers of conjugated diolefin hydrocarbons and copolymers of such diolefins with mono-olefinic compounds copolymerizable therewith by emulsion polymerization methods. Such mono-olefins include styrene; alpha-methylstyrene; p-methylstyrene; alpha, p-dimethylstyrene; acrylic and methacrylic nitriles, amides, acids and esters; vinyl-pyridines; fumaric esters; methylenemalonic esters; vinylidene chloride; methyl vinyl ketone; and methyl isopropenyl ketone. Mixtures of such mono-olefinic compounds can also be copolymerized with the diolefin. The term "high olefinic unsaturation" here connotes an amount of unsaturation on the order of that occurring in Hevea rubber. The copolymers must contain copolymerized therein at least about 35% of the diolefin hydrocarbon. The butyl rubbers, which are elastomers made by an ionic polymerization process, from a major amount of an isoolefin and a minor amount of a conjugated diolefin hydrocarbon in an organic solvent, are not curable with maleimides, and are excluded from the scope of the invention.

The satisfactory operation of this invention does not require a filler when the rubber is natural or Hevea rubber. In the case of a single synthetic rubber or a mixture of two or more synthetic rubbers, it is important to employ a filler, the minimum quantity thereof being well known to those skilled in the art of rubber compounding. Generally, I prefer to use at least 10 parts by weight of filler per 100 parts by weight of rubber, although this minimum is not critical. The preferred fillers are the carbon blacks and the hydrated silicas. However, other fillers conventionally used in the rubber industry also are operable in my invention. Such fillers are titanium dioxide, clay, whiting, etc. Of course, the physical properties of the vulcanizates will vary considerably depending on the kind of fillers used, as also is well known to anyone skilled in rubber compounding. So far as vulcanization is concerned, the maximum amount of filler is not critical. Those skilled in the art will understand that the practical maximum is that figure at which the physical properties of the vulcanizate begin to fall off objectionably.

I prefer to use butadiene-1,3 as the conjugated diolefin hydrocarbon in the synthetic homopolymers and copolymers, but other conjugated diolefin hydrocarbons which contain as many as six carbon atoms may be used, e.g., isoprene, piperylene, and 2,3-dimethylbutadiene.

The styrene/butadiene copolymer rubbers used in my invention are conventionally termed "SBR", in accordance with A.S.T.M. recommendations.

Among the acrylic-type monomers which may be used in making copolymer rubbers to be cured by the method of the invention are acrylonitrile; methacrylonitrile; acrylic acid and its alkyl esters, e.g., methyl acrylate, ethyl acrylate, butyl acrylate, and 2-ethylhexyl acrylate; methacrylic acid and its alkyl esters; acrylamide, N-monoalkylacrylamides, N-dialkylacrylamides, N-monoaralkylacrylamides, N-diaralkylacrylamides. The most important of these monomers is acrylonitrile, the corresponding diolefin: acrylonitrile elastomers being conventionally now called "NBR," sold commercially under the names "Paracril," "Hycar," etc.

Typical vinylpyridines are 2-vinylpyridine, 3-vinylpyridine, 4-vinylpyridine, 2-methyl-5-vinylpyridine, 5-ethyl-2-vinylpyridine, 2-methyl-6-vinylpyridine, 2 - ethyl-4-vinylpyridine etc.

Among the fumarates are the symmetrical and unsymmetrical alkyl esters of fumaric acid, e.g., diethyl fumarate, ethyl methyl fumarate.

Among the methylenemalonic esters are the esters with an alkanol, more specifically diethyl methylenemalonate, diisopropyl methylenemalonate, di-n-butylmethylenemalonate, diisobutyl methylenemalonate, dimethyl methylenemalonate, etc. Unsymmetrical esters also can be used.

The synthetic rubber, filler, and curing agent of the present invention, together with any other desired materials such as accelerators of the type described below, plasticizers, antioxidants, and other conventional rubber compounding ingredients, are intimately mixed in any convenient manner used in the rubber industry, e.g., on a rubber mill or in an internal mixer.

The temperature of mixing can vary between 160° and 275° F. depending upon the amount and kind of filler, and the type of mixing equipment. The compounded rubber is then converted to any desired shape and size, and is vulcanized at temperatures from 200° F. to 400° F. for from 2 minutes to 8 hours depending on the size and shape of the article being cured. Cures may be made in any well-known way as in a mold under pressure or in an open container in an oven.

A further feature of my invention comprises the addition of general purpose thiazole-type accelerators, such as 2-mercapto-benzothiazole, 2,2'-dibenzothiazyl disulfide, and the benzothiazole sulfenamides, such as N-oxydiethylene-2-benzothiazole sulfenamide and N-cyclohexyl-2-benzothiazole sulfenamide. These vulcanization accelerators when added to the rubber, vulcanizing agent and filler mixtures greatly increase the rate of vulcanization induced by the bismaleimides and biscitraconimides. In many cases, the time of vulcanization can be reduced to one-half or even less by this acceleration. Alternatively, at the operator's convenience, the time can be kept constant and the temperature decreased below that used to obtain an equivalent cure without an acecelerator.

The amount of accelerator can usefully range from 0.25 part of 2.0 or more parts.

The vulcanization procedure of the present invention has many advantages over previously known vulcanizing processes. Among these are the following:

(1) The rubber stocks vulcanized by the new process of my invention have a far better resistance to oxidative aging than does rubber vulcanized with sulfur. For example when aged in an oxygen atmosphere (300#/sq. in. at 70° C.), the new stocks of my invention deteriorate much less rapidly than a standard sulfur stock. Thus, these new stocks are especially useful in products which must operate for considerable periods of time at elevated temperatures. Such products are tires, curing bags for tires, rubber motor mountings, steam hose, gaskets, and belts for hot machinery, conveyor belts for moving hot materials, flexible hot air ducts, hot water bottles, etc.

(2) The new stocks of the present invention may be used in contact with metals such as copper, silver, etc. which are tarnished by stocks vulcanized by sulfur. The advantages of using these new non-sulfur vulcanizates for rubber-metal objects, e.g., composite rubber and metallic cloth or fabric articles, rubber-insulated wire, headlights, silverware, copperware, etc. are obvious.

(3) The compounded but unvulcanized stocks made in accordance with the principles of my invention can be processed at higher temperatures without scorching than can stocks containing sulfur as the vulcanizing agent. This is particularly advantageous when mixing compounded rubber in large batches in Banbury mixers, usually operated at quite high temperatures, and when shaping articles by injection molding.

The following examples illustrate the invention. All parts are by weight.

*Example 1*

Example 1 illustrates the gist of the invention, i.e., the practical cure of a highly unsaturated rubber like commercial SBR with bismaleimides.

A masterbatch in the proportion of 100 parts of a commercial SBR comprising butadiene and styrene in the ratio 76:24 and made at 5° C., and 50 parts of carbon black was made in a Banbury internal mixer. Portions of the masterbatch were mixed on a rubber mill with various maleimides to form the stocks shown below. The stocks were cured as shown in molds under pressure. After the curved stocks had returned to room temperature they were tested conventionally to determine extent of cure. The tensile strength and elongation were measured on a Scott Tensile tester, the modulus on an autographic stress-strain tester.

| Stock | 1 | 2 |
| --- | --- | --- |
| Masterbatch | 150 | 150 |
| N,N'-m-Phenylene-bis-maleimide | 2 | |
| N,N-Ethylene-bis-maleimide | | 2 |
| Physical Properties: | | |
| A. Cured 60 min. at 166° C.: | | |
| Tensile strength (p.s.i.) | 940 | 850 |
| Elongation (percent) | 510 | 520 |
| 200% Modulus (p.s.i.) | 320 | 310 |
| 300% Modulus (p.s.i.) | 480 | 500 |
| B. Cured 60 min. at 195° C.: | | |
| Tensile strength (p.s.i.) | | 1,640 |
| Elongation (percent) | (1) | 220 |
| 200% Modulus (p.s.i.) | | 1,370 |

[1] Not run.

*Example 2*

Example 2 demonstrates that it is possible to accelerate the bismaleimide cure of a highly unsaturated rubber using a thiazole-type accelerator.

The following stocks were mixed, cured and tested as in Example 1.

| Stock | 3 |
| --- | --- |
| Masterbatch (see Ex. 1) | 150 |
| N,N'-m-Phenylene-bis-maleimide | 2 |
| 2-Mercaptobenzothiazole | 0.5 |
| Physical Properties: | |
| A. Cured 60 min. at 166° C.: | |
| Tensile strength (p.s.i.) | 1,870 |
| Elongation (percent) | 290 |
| 200% Modulus (p.s.i.) | 1,030 |
| 300% Modulus (p.s.i.) | |

The above example, by comparinson with Example 1, shows the spectacular acceleration of the bismaleimide cure by means of an accelerator such as 2-mercaptobenzothiazole.

*Example 3*

Example 3 hows that it is possible to accelerate the bismaleimide cure of highly unsaturated rubbers using a thiazyl disulfide accelerator.

A masterbatch in the proportion of 100 parts of SBR (described in Example 1), 50 parts of carbon black, and 5 parts of a hydrocarbon plasticizing oil was made in a Banbury. Portions of the masterbatch were mixed on a mill with the materials shown individually to form the stocks shown below. They were cured at 153° C. for the times shown below and tested as in Example 1.

| Stock | | 4 |
|---|---|---|
| Masterbatch | | 155 |
| N,N'-m-Phenylene-bis-maleimide | | 1 |
| 2,2'-Dibenzothiazyl disulfide | | 1 |
| | Time of Cure (min.) | |
| Physical Properties: | | |
| Tensile strength (p.s.i.) | 30 | 2,090 |
| | 45 | 2,190 |
| | 60 | 2,280 |
| | 90 | 2,310 |
| | 180 | 2,200 |
| Elongation (percent) | 30 | 460 |
| | 45 | 410 |
| | 60 | 420 |
| | 90 | 400 |
| | 180 | 350 |
| 300% Modulus (p.s.i.) | 30 | 950 |
| | 45 | 1,150 |
| | 60 | 1,250 |
| | 90 | 1,330 |
| | 180 | 1,500 |

This example shows, by comparison with Example 1, that 2,2'-dibenzothiazyl disulfide is a powerful accelerator of cure for a bismaleimide.

*Example 4*

Example 4 demonstrates the fact that the successful operation of this invention requires some filler in the case of a synthetic rubber.

The following stocks were mixed in a Banbury, and then were cured for 60 minutes at the temperatures shown below, and were tested as in Example 1.

| Stock | | 5 | 6 | 7 | 8 | 9 |
|---|---|---|---|---|---|---|
| SBR (see Ex. 1) | | 100 | 100 | 100 | 100 | 100 |
| Carbon Black | | | 5 | 10 | 20 | 50 |
| N,N'-m-Phenylene-bis-maleimide | | 2 | 2 | 2 | 2 | 2 |
| 2-Mercaptobenzothiazole | | 2 | 2 | 2 | 2 | 2 |
| | Temp. of Cure (° C.) | | | | | |
| Physical Properties: | | | | | | |
| Tensile strength (p.s.i.) | 145 | 170 | 490 | 640 | 1,100 | 2,310 |
| | 166 | 200 | 280 | 410 | 670 | 1,380 |
| Elongation (percent) | 145 | 2,200 | 1,250 | 860 | 700 | 590 |
| | 166 | 1,000 | 570 | 450 | 330 | 240 |
| 200% Modulus (p.s.i.) | 145 | 40 | 70 | 100 | 160 | 440 |
| | 166 | 60 | 100 | 150 | 300 | a 400 | a 100% modulus.

The above example shows that at least ten parts of a filler such as carbon black are preferred in the operation of this invention when the rubber is a synthetic rubber.

*Example 5*

Example 5 illustrates the operation of this invention with another bismaleimide, namely maleimidomethyl ether and SBR rubber.

A masterbatch in the proportion of 100 parts of SBR, 40 parts of carbon black, and 7.5 parts of hydrocarbon plasticizing oil was made in a Banbury. Portions of the masterbatch were mixed with maleimidomethyl ether and 2,2'-dibenzothiazyl disulfide, in the amounts shown below, on a mill to form stocks which were cured at 153° C. and tested as in Example 1.

| Stock | | 10 | 11 |
|---|---|---|---|
| Masterbatch | | 147.5 | 147.5 |
| Maleimidomethyl ether | | 0.88 | 1.76 |
| 2,2'-dibenzothiazyl disulfide | | 1.0 | 1.0 |
| | Time of Cure (min.) | | |
| Physical Properties: | | | |
| Tensile strength (p.s.i.) | 22 | 1,020 | 1,050 |
| | 45 | 915 | 910 |
| | 90 | 835 | 700 |
| Elongation (percent) | 22 | 440 | 310 |
| | 45 | 340 | 260 |
| | 90 | 310 | 200 |
| 200% Modulus (p.s.i.) | 22 | 300 | 530 |
| | 45 | 430 | ------ |
| | 90 | 440 | ------ |

*Example 6*

All of the preceding examples, 1 to 5 illustrate the operation of this invention for the cure of SBR rubber. The following examples illustrate that other highly unsaturated rubbers are cured by the method of this invention. In particular Example 6 illustrates the cure of natural rubber accelerated with 2,2'-dibenzothiazyl disulfide.

The following stocks were mixed, cured at 145° C., and tested as in Example 1, except that the masterbatch consisted of Hevea rubber (smoked sheet) and carbon black in the proportion of 100:50.

| Stock | | 12 | 13 | 14 | 15 | 16 |
|---|---|---|---|---|---|---|
| Hevea masterbatch | | 150 | 150 | 150 | 150 | 150 |
| BLE a | | 1.2 | 1.2 | 1.0 | 1.0 | 1.0 |
| N,N'-diphenyl-p-phenylene diamine | | 0.3 | 0.3 | ----- | ----- | ----- |
| 2,2'-dibenzothiazyl disulfide | | 1.0 | 1.0 | 1.5 | 1.5 | 1.5 |
| Hydrocarbon plasticizing oil b | | 2.0 | 2.5 | ----- | ----- | ----- |
| N,N'-m-Phenylene-bismaleimide b | | 2.0 | 2.5 | ----- | ----- | ----- |
| N,N'-Hexamethylene-bis-maleimide | | ----- | ----- | 1.0 | 2.0 | ----- |
| 2,6-Bis-maleimidomethyl-5-tt-octylphenol | | ----- | ----- | ----- | ----- | 2.5 |
| | Time of cure (min.) | | | | | |
| Physical Properties: | | | | | | |
| Tensile strength (p.s.i.) | 45 | 3,190 | 3,330 | 2,990 | 3,330 | 3,250 |
| | 90 | 3,050 | 3,330 | 2,560 | 3,400 | 3,280 |
| Elongation (percent) | 45 | 490 | 480 | 530 | 480 | 510 |
| | 90 | 470 | 470 | 470 | 460 | 490 |
| 300% Modulus (p.s.i.) | 45 | 1,430 | 1,570 | 1,030 | 1,550 | 1,280 |
| | 90 | 1,410 | 1,680 | 1,090 | 1,700 | 1,420 | a Condensation product of diphenylamine and acetone.
b Curing agent and oil premixture.

The above example shows that carbon black reinforced natural rubber can be cured with several different bismaleimides plus a thiazole-type accelerator like 2,2'-dibenzothiazyl disulfide.

*Example 7*

Example 7 demonstrates that carbon black reinforced natural rubber stocks cured by the method of this invention exhibit superior aging resistance to conventional sulfur cured counterparts.

A masterbatch in the proportion of 100 parts of Hevea rubber (#2 smoked sheet) and 50 parts of carbon black was made in a Banbury mixer. Portions of the masterbatch were mixed on a rubber mill to form the stocks below. The stocks were cured at 145° C. for the indicated time schedules in molds under pressure. After the cured stocks had cooled to room temperature, they were tested conventionally both before and after aging in an oxygen bomb for the indicated periods of time.

| Stock | 17 | 18 |
|---|---|---|
| Masterbatch | 150.0 | 150.0 |
| Stearic Acid | 4.0 | |
| Pine Tar | 2.0 | |
| BLE [a] | 1.2 | 1.2 |
| N,N'-diphenyl-p-phenylene diamine | 0.3 | 0.3 |
| 2-Mercaptobenzothiazole | 1.0 | |
| Sulfur | 2.5 | |
| 2,2'-dibenzothiazyl disulfide | | 1.0 |
| N,N'-m-phenylene-bis-maleimide | | 2.5 |
| Circo Light Processing Oil | | 2.5 |
| Kadox zinc oxide | | 2.5 |

[a] Condensation product of diphenylamine and acetone.

| Property | Time of Cure (min.) | 17 | | 18 | |
|---|---|---|---|---|---|
| | | Green | Aged, 96 hrs. in Oxygen Bomb | Green | Aged, 96 hrs. in Oxygen Bomb |
| Tensile (p.s.i.) | 45 | 3,700 | 2,060 | 3,330 | 2,480 |
| | 90 | 3,470 | 1,760 | 3,330 | 2,600 |
| Elongation (percent) | 45 | 530 | 330 | 480 | 440 |
| | 90 | 550 | 300 | 470 | 410 |
| Cut Growth, 150° F | 45 | 1,380 | 340 | 315 | 400 |
| | 90 | 1,125 | 135 | 251 | 340 |
| Flex Cracking (kilocycles to Failure) | 45 | 195 | 124 | 110 | 125 |
| | 90 | 215 | 86 | 90 | 105 |
| Abrasion Resistance | 45 | 105 | 54 | 69 | 65 |
| | 90 | 92 | 46 | 65 | 59 |

From the above example it is apparent that tread stock 18 cured with N,N'-m-phenylene-bismaleimide, exhibits superior oxygen bomb aging to the conventionally sulfur-cured tread stock 17 as evidenced by (1) A higher percentage retention of tensile strength, elongation at break and abrasion resistance, and
(2) No loss in cut growth and flex cracking.

Example 8

Example 8 illustrates the cure of gum natural rubber by the method of this invention using a bismaleimide in conjunction with a thiazole accelerator.

The following stocks were mixed on a two roll rubber mixing mill with stock temperatures held in the range of 80° to 90° and cured at 160° C.

| Stock | 19 | 20 |
|---|---|---|
| #2 Smoked Sheet | 100.0 | 100.0 |
| N,N'-m-phenylene-bis-maleimide | 2.5 | 2.5 |
| 2,2'-dibenzothiazyl disulfide | | 1.0 |

| Properties: | Time of Cure (min.) | | |
|---|---|---|---|
| Tensile (p.s.i.) | 30 | 410 | 1,230 |
| | 60 | 780 | 1,750 |
| | 120 | 1,190 | 2,210 |
| Elongation (percent) | 30 | 1,050 | 930 |
| | 60 | 1,010 | 850 |
| | 120 | 980 | 870 |
| 500% Modulus (p.s.i.) | 30 | 75 | 175 |
| | 60 | 125 | 300 |
| | 120 | 185 | 375 |

The above example shows that bis-maleimides will cure gum or unfilled Hevea rubber in the presence of an accelerator like 2,2'-dibenzothiazyl disulfide.

Example 9

Example 9 illustrates the operation of this invention for the cure of a carbon black reinforced vinylpyridine/butadiene rubber with a bismaleimide.

A masterbatch in the proportion of 100 parts of 2-methyl-5-vinylpyridine: butadiene rubber (25:75), 50 parts of carbon black, and 5 parts of hydrocarbon plasticizing oil was made in a Banbury. Portions of the masterbatch were mixed on the mill with the materials shown below to form stocks which were cured at 145° C. and tested as in Example 1.

| Stock | 21 |
|---|---|
| Masterbatch | 155 |
| 2,2'-dibenzothiazyl disulfide | 2.0 |
| Hydrocarbon Plasticizing oil [a] | 1.25 |
| N,N'-m-phenylene-bis-maleimide [a] | 1.25 |

| Physical Properties: | Time of Cure (min.) | |
|---|---|---|
| Tensile Strength (p.s.i.) | 22 | 1,640 |
| | 45 | 2,090 |
| | 90 | 2,350 |
| Elongation (percent) | 22 | 760 |
| | 45 | 630 |
| | 90 | 540 |
| 300% Modulus | 22 | 400 |
| | 45 | 630 |
| | 90 | 880 |

[a] Curing agent and oil were mixed as shown in Example 6.

The above example shows that vinylpyridine rubbers can be cured by the method of this invention.

Example 10

Example 10 illustrates the operation of this invention for the cure of acrylonitrile:butadiene rubbers with bis-maleimides.

The following stocks were mixed on a mill, and cured and tested as shown in Example 1.

| Stock | 22 | 23 |
|---|---|---|
| Paracril B [a] | 100 | |
| Hycar GR-15 [b] | | 100 |
| Carbon Black | 85 | 50 |
| Methoxyethyl acetyl ricinoleate | 30 | |
| 2,2'-dibenzothiazyl disulfide | 2 | |
| 2-Mercaptobenzothiazole | | 2.25 |
| Hydrocarbon plasticizing oil [c] | 2 | |
| N,N'-m-phenylene-bismaleimide [c] | 2 | 2.25 |

| Physical Properties: | Cure Time (min.) | Cure Temp. (°C.) | | |
|---|---|---|---|---|
| Tensile Strength (p.s.i.) | 60 | 153 | 1,300 | |
| | 30 | 166 | | 1,810 |
| | 60 | 166 | 1,470 | |
| Elongation (percent) | 60 | 153 | 390 | |
| | 30 | 166 | | 300 |
| | 60 | 166 | 320 | |
| 200% Modulus (p.s.i.) | 60 | 153 | 480 | |
| | 30 | 166 | | 1,040 |
| | 60 | 166 | 660 | |

[a] Acrylonitrile: butadiene rubber (25:75).
[b] Acrylonitrile: butadiene rubber (said to be about 45:55).
[c] Curing agent and oil were mixed as shown in Example 6.

The above example shows that acrylonitrile rubbers can be cured by the method of this invention.

Example 11

Example 11 demonstrates that it is possible to use other types of general purpose thiazole accelerators to accelerate the bismaleimide cure of highly unsaturated rubbers.

A masterbatch in the proportion of 100 parts of SBR (described in Example 1) 50 parts of carbon black, and 8 parts of a hydrocarbon plasticizing oil was made in a Banbury mixer. Portions of the masterbatch were mixed on a mill with the materials shown individually to form the stocks shown below. They were cured at 153° C. for the times shown below and tested as in Example 1.

| Stock | 24 | 25 | 26 |
|---|---|---|---|
| Masterbatch | 158 | 158 | 158 |
| N,N'-m-phenylene-bis-maleimide | 1.1 | 1.1 | 1.1 |
| 2,2'-dibenzothiazyl disulfide | 2 | | |
| N-Oxydiethylene-2-benzothiazole-sulfenamide | | 2 | |
| N-Cyclohexyl-2-benzothiazole-sulfenamide | | | 2 |
| Physical Properties: | Time of Cure | | | |
| Tensile Strength (p.s.i.) | 22 | 2,610 | 1,790 | 1,420 |
|  | 45 | 2,630 | 2,130 | 1,500 |
|  | 90 | 2,760 | 2,250 | 1,560 |
| Elongation (percent) | 22 | 530 | 650 | 700 |
|  | 45 | 440 | 590 | 650 |
|  | 90 | 420 | 550 | 640 |
| 300% Modulus (p.s.i.) | 22 | 1,100 | 550 | 400 |
|  | 45 | 1,400 | 775 | 465 |
|  | 90 | 1,575 | 850 | 520 |

The above example demonstrates the accelerating effect of two other general purpose thiazole-type accelerators on the cure of highly unsaturated rubber-like SBR.

*Example 12*

Example 12 illustrates that a practical cure of highly unsaturated rubbers, such as commercial SBR, can be obtained with biscitraconimides. A masterbatch was prepared as in Example 1. Portions of this masterbatch were mixed on a rubber mill with biscitraconimide itself.

| Stock | 27 |
|---|---|
| Masterbatch | 150 |
| Bis-citraconimide | 2 |

This stock was cured under pressure and tested conventionally to determine the extent of cure. The physical characteristics, i.e., tensile strength, elongation and modulus, were substantially similar to those obtained with stocks 1 and 2 of Example 1. These data show that SBR can be cured with the biscitraconimides.

*Example 13*

The SBR masterbatch was prepared in the manner described in Example 1, except that 55 parts of a medium processing channel black per 100 parts of rubber was employed. These data show the accelerating effect of hydroperoxide and of aliphatic azo compound on bis-maleimide cures of highly unsaturated rubbers.

| Stock | 28 | 29 | 30 |
|---|---|---|---|
| Masterbatch | 155 | 155 | 155 |
| N,N'-(1,3-phenylene)-bismaleimide | 2 | 2 | 2 |
| tert-butyl hydroperoxide | 2 | | |
| 2,2'-azobis-isobutyronitrile | | 2 | |
| Physical Properties: | | | |
| Cured 30 min. at 165° C.: | | | |
| Tensile Strength (p.s.i.) | 700 | 1,130 | 460 |
| Elongation (percent) | 510 | 275 | 480 |
| 200% Modulus (p.s.i.) | 270 | 745 | 250 |
| 300% Modulus (p.s.i.) | 435 | | 350 |
| Cured 30 min. at 195° C.: | | | |
| Tensile Strength (p.s.i.) | 1,600 | 1,210 | 1,660 |
| Elongation (percent) | 325 | 200 | 395 |
| 200% Modulus (p.s.i.) | 800 | 1,200 | 650 |
| 300% Modulus (p.s.i.) | 1,440 | | 1,240 |

Having thus described my invention, what I claim and desire to protect by Letters Patent is:

1. A process for vulcanizing rubbers selected from the group consisting of homopolymers of aliphatic conjugated diolefin hydrocarbons, heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, and from 0.25 to 6.0 parts by weight of a N,N'-linked bis-maleimide curing agent.

2. A process for vulcanizing highly unsaturated rubbers selected from the group consisting of homopolymers of aliphatic conjugated diolefin hydrocarbons, and heteropolymers of such diolefin hydrocarbons with copolymerizable monoolefinic compounds, said heteropolymers containing at least 35% of said diolefin hydrocarbon copolymerized therein, comprising heating at a temperature of from 200° F. to 400° F. for a period of from 2 minutes to 8 hours a mixture comprised of 100 parts by weight of the rubber, from 0.25 to 6.0 parts by weight of a N,N'-linked bis-maleimide curing agent, and from 0.25 to 2.0 parts by weight of a thiazole accelerator.

3. A process as in claim 1, wherein the curing agent is N,N'-ethylenebis-maleimide.

4. A process as in claim 1, wherein the curing agent is N,N'-m-phenylene-bis-maleimide.

5. A process as in claim 1, wherein the curing agent is N,N'-p-phenylene-bis-maleimide.

6. A process as in claim 1, wherein the curing agent is 2,6-bis-(maleimidomethyl)-4-t-butylphenol.

7. A process as in claim 1, wherein the curing agent is N,N'-(2,4-tolylene)-dimaleimide.

8. A process for vulcanizing a rubber which is a homopolymer of an aliphatic conjugated diolefin hydrocarbon, comprising heating at a temperature of from 200° F. to 400° F. for a period of from 2 minutes to 8 hours a mixture consisting essentially of 100 parts by weight of the rubber and from 0.25 to 6.0 parts by weight of a N,N'-linked bis-maleimide curing agent.

9. A process as in claim 8, wherein the unvulcanized rubbery reaction mass is admixed prior to heating with from 0.25 part to about 2.0 parts by weight of a thiazole accelerator.

10. A process as in claim 9, wherein the thiazole accelerator is 2-mercaptobenzothiazole.

11. A process as in claim 9, wherein the thiazole accelerator is 2,2'-dibenzothiazyl disulfide.

12. A vulcanizate comprising 100 parts of rubber selected from the group consisting of homopolymers of aliphatic conjugated diolefin hydrocarbons, heteropolymers of such diolefin hydrocarbons with copolymerizable monoolefin compounds, said heteropolymers containing at least 35% of said diolefin hydrocarbon copolymerized therein, and from 0.25 to 6.0 parts of a N,N'-linked bis-maleimide curing agent.

13. A vulcanizate comprising 100 parts of rubber selected from the group consisting of homopolymers of aliphatic conjugated diolefin hydrocarbons and heteropolymers of such diolefin hydrocarbons with copolymerizable monoolefin compounds, said heteropolymers containing at least 35% of said diolefin hydrocarbon copolymerized therein, and from 0.25 to 6.0 parts of a N,N'-linked bis-maleimide curing agent, and from 0.25 to about 3.0 parts by weight of a thiazole accelerator.

14. A vulcanizate as in claim 12, wherein the curing agent is N,N'-ethylene-bis-maleimide.

15. A vulcanizate as in claim 12, wherein the curing agent is N,N'-m-phenylene-bis-maleimide.

16. A vulcanizate as in claim 12, wherein the curing agent is N,N'-p-phenylene-bis-maleimide.

17. A vulcanizate as in claim 12, wherein the curing agent is 2,6-bis-(maleimidomethyl)-4-t-butylphenol.

18. A vulcanizate comprising 100 parts of rubber selected from the group consisting of homopolymers of aliphatic conjugated diolefin hydrocarbons, heteropolymers of such diolefin hydrocarbons with copolymerizable monoolefin compounds, said heteropolymers containing at least 35% of said diolefin hydrocarbon copolymerized therein, a pigment filler, and from 0.25 to 6.0 parts of a N,N'-linked bis-maleimide curing agent.

19. A vulcanizate comprising a highly unsaturated rubber as defined in claim 2, a N,N'-linked bis-maleimide curing agent, and from 0.25 to about 2.0 parts of a thiazole accelerator.

20. A composition comprising a high molecular weight substantially unsaturated polymer prepared from conjugated diolefins, from 0.25 to 3% by weight of a compound selected from the group consisting of organic peroxides and azobisaliphatic nitriles, and from 0.5 to 6% by weight of a N,N'-substituted bis-maleimide.

21. A process for curing high molecular weight, substantially unsaturated polymers prepared from conjugated diolefins which comprises incorporating with said polymers (a) from 0.25 to 3% by weight of a compound selected from the group consisting of organic peroxides and azobisaliphatic nitriles and (b) from 0.5 to 6% by weight of a N,N'-substituted bis-maleimide, and heating said polymers to a temperature of about 93 to 150° C. until a cure is obtained.

22. The product obtained by the process of claim 21.

23. A composition comprising a high molecular weight, substantially unsaturated polymer prepared from conjugated diolefins, from 0.5 to 1.0% by weight of a compound selected from the group consisting of organic peroxides and azobisaliphatic nitriles, and from 0.5 to 5.0% by weight of a N,N'-substituted bis-maleimide.

24. A process for curing high molecular weight, substantially unsaturated polymers prepared from conjugated diolefins which comprises incorporating with said polymers (a) from 0.5 to 1.0% by weight of a compound selected from the group consisting of organic peroxides and azobisaliphatic nitriles and (b) from 0.5 to 5.0% by weight of a N,N'-substituted bis-maleimide, and heating said polymers to a temperature of about 93 to 150° C. until a cure is obtained.

References Cited in the file of this patent

UNITED STATES PATENTS

| | | |
|---|---|---|
| 2,822,342 | Ford | Feb. 4, 1958 |
| 2,925,407 | Goldberg | Feb. 16, 1960 |